Dec. 14, 1943. T. J. STEPHENS 2,337,006
BAKE OVEN
Filed Aug. 3, 1940 5 Sheets-Sheet 3
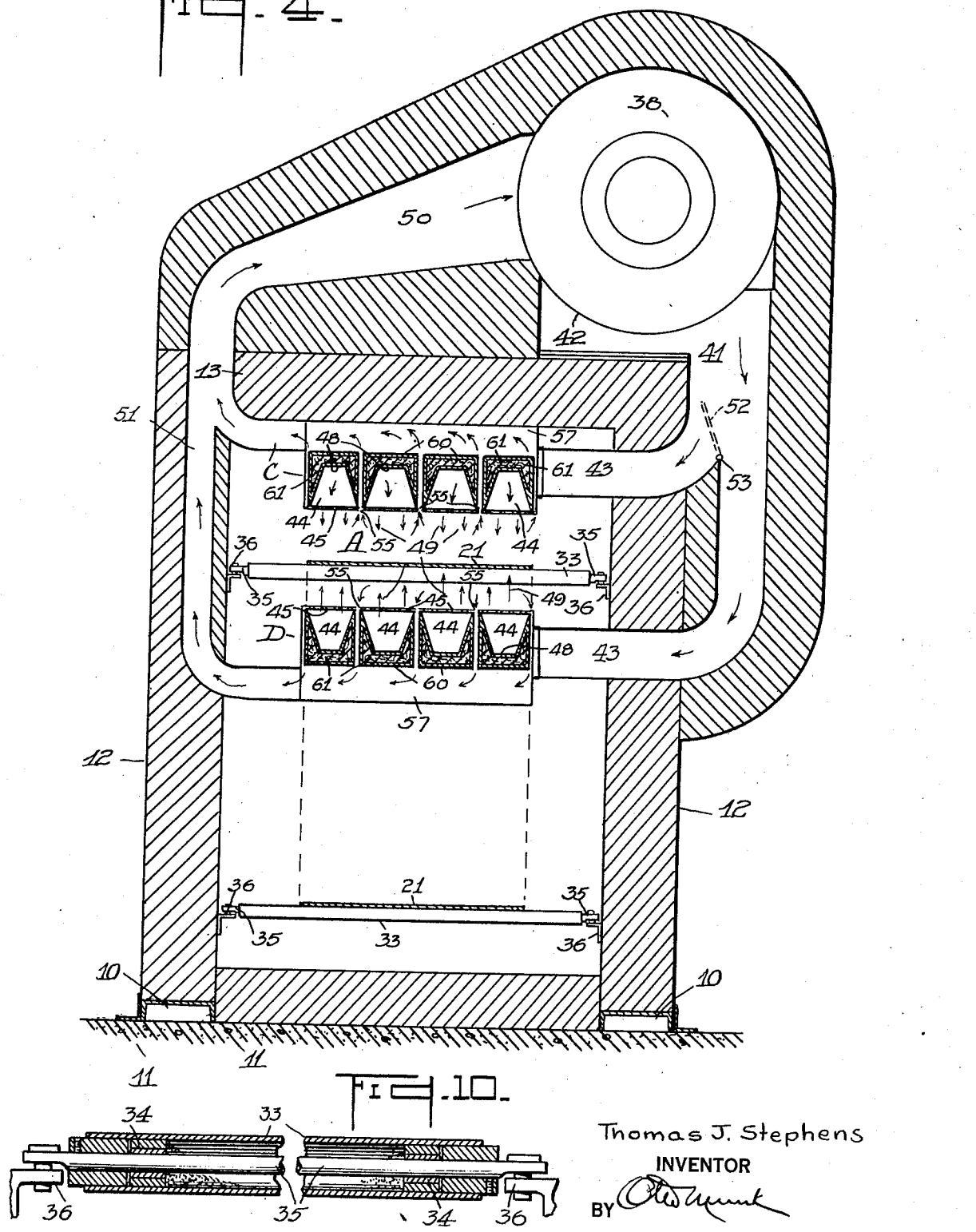
Thomas J. Stephens
INVENTOR
BY
ATTORNEY

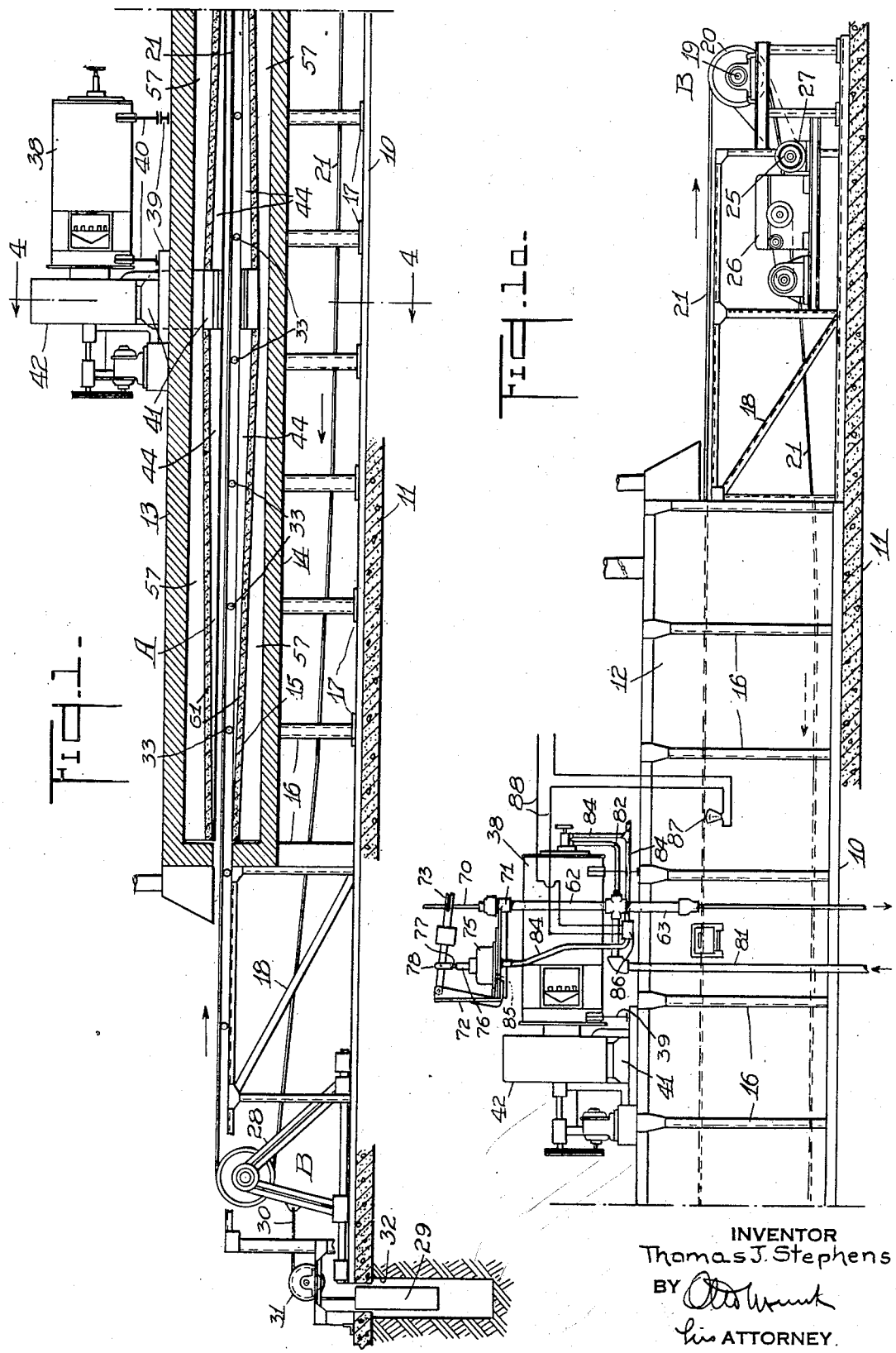

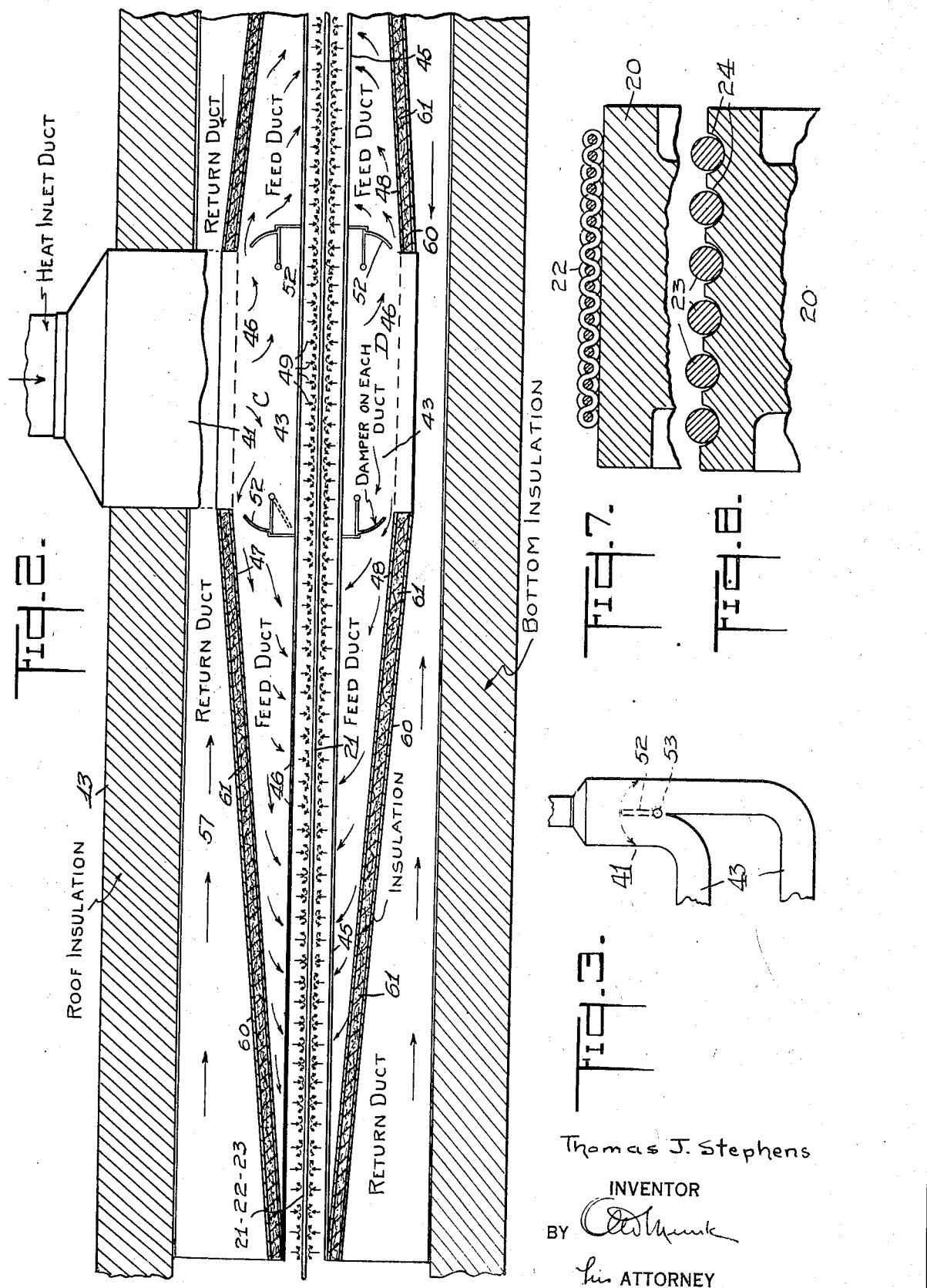

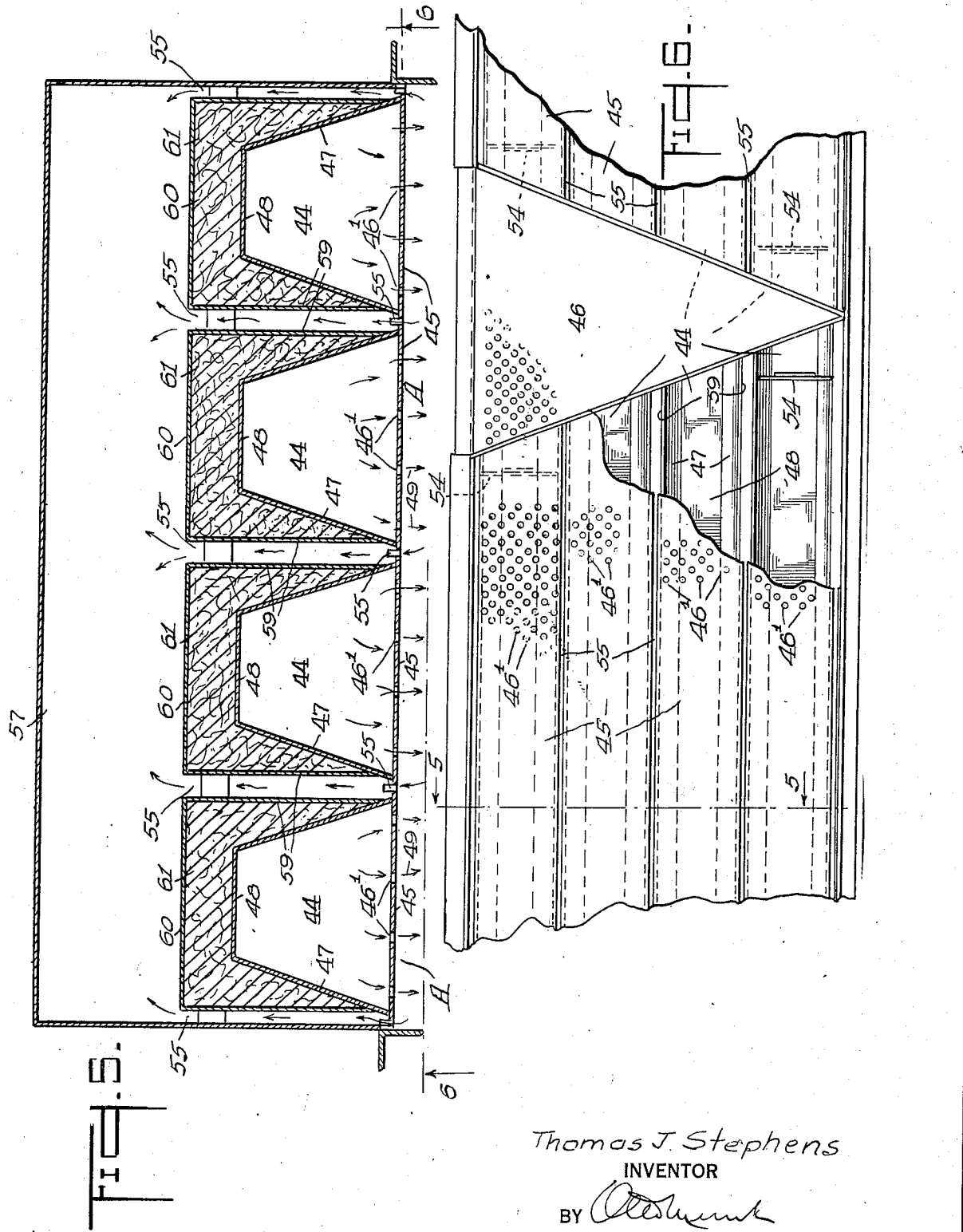

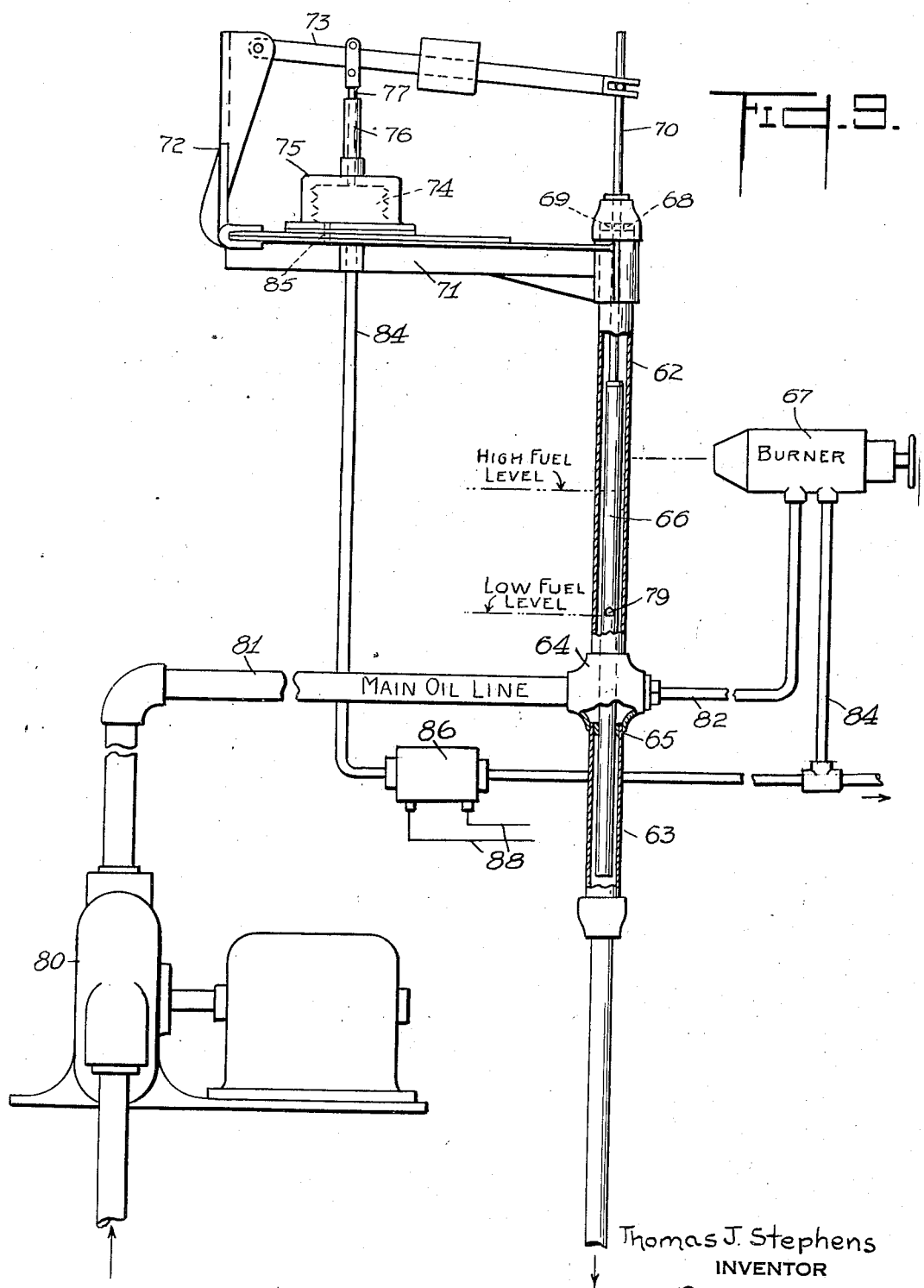

Patented Dec. 14, 1943

2,337,006

UNITED STATES PATENT OFFICE 2,337,006

BAKE OVEN

Thomas J. Stephens, New York, N. Y.

Application August 3, 1940, Serial No. 350,927

3 Claims. (Cl. 107—57)

This invention relates to bake ovens and has reference more especially to apparatus for the generation, temperature control, transfer, distribution and application of heat to products, which are made to progressively and continuously traverse the length of an enclosed baking or heat treating chamber.

The objects of the invention are, first, to provide an efficiently constructed heat treating chamber of a length substantially greater than the dimensions of either the width or height thereof; second, to arrange longitudinally within the heat treating chamber a continuous carrier which is spaced from the walls of the chamber to provide a maximum efficiency in the operation of the carrier; third, to afford a combination of heat distributors and reducts for the chamber, the heat distributors being disposed in heat exchange relation to the carrier and with their delivery faces in planes preferably parallel to said carrier and in closed communication with a delivery port of a gas mover or blower; fourth, to provide a suitable heat generator to deliver heated gases to the intake of said gas mover and in closed communication with said return ducts, whereby spent gases, which still retain a portion of their initial heat, are caused to flow through said return ducts from the heat treating chamber in heat exchange relation with the elements of said heat generator; and fifth, to control the supply of fuel to the combustion chamber of said heat generator in accordance with the requirements of the heat treating chamber.

The objects of the present invention are accomplished by means of the various steps in a method of operation hereinafter described, and as practiced in a bake oven apparatus and control therefor illustratively exemplified in the accompanying drawings, and set forth in the appended claims.

In the drawings:

Figures 1 and 1a constitute a side view of an entire oven, Figure 1 being a substantially longitudinal sectional view of the receiving end of the oven, and Figure 1a is a side elevational view of the delivery end;

Figure 2 is a substantially longitudinal sectional view of a portion of an oven showing the heat distributing arrangement;

Figure 3 is a detail view, on a small scale, of the heat delivery conduits;

Figure 4 is a substantially transverse sectional view of the oven taken on lines 4—4 of Figure 1;

Figure 5 is a substantially transverse sectional view of one of a heat distributor duct units taken on lines 5—5 of Figure 6;

Figure 6 is a plan view of the distributor duct unit;

Figure 7 is a longitudinal sectional view of a portion of a drum and continuous screen band or carrier;

Figure 8 is a longitudinal sectional view of a portion of a drum with grooves to accommodate the separate cable strands which make up the band or carrier;

Figure 9 is a detailed view of the oil leveling device and control for the heat generator;

Figure 10 is a detail sectional view of one of the supporting rollers for the continuous oven band.

Briefly, the present invention, in the embodiment shown and described, is applicable particularly to an oven which is especially designed and constructed for the purpose of producing soda crackers, wafers, cookies and the like, but it will be understood that the apparatus is equally well adapted for other uses requiring an oven of the band type having heat controlled areas through which the materials to be treated are passed.

Referring now to the drawings, the construction of the oven comprises vertical wall columns 16, each comprising two channel beams welded in parallel position perpendicular to a square foot plate 17. The channel beams 16 are positioned with their flanges inwardly and are spaced preferably less than one foot apart. The end channel beams are longer than the others and are braced in parallel position at the top of the inner channel by a bar 18 or tube extending from one to the other and welded to each.

The oven assembly is further provided with journal bearings B which are secured in position at a distance from each end of the heat treatment chamber, and preferably located on extensions of foundation channel 10. A journal 19, carrying a pulley 20 of appropriate dimensions, is mounted in each set of said journal bearings B and positioned perpendicularly to the central line of the heat treatment chamber A. The purpose of the pulleys is to carry a united, endless belt of steel 21, woven wire 22, or a plurality of parallel cables 23, the latter being accommodated in annular grooves 24 in the pulleys 20. In each instance, the belt comprises the carrying means for the product to be heat treated.

At the discharge end of the baking chamber, appropriate variable speed driving means 25 is connected to the pulley 20 and to a prime mover 27, such, for example, as an electric motor, for causing rotation of the pulley 20. At the opposite end, provision is made for changing the position of the pulley by mounting the journal bearings B on guided slide members 28 in such manner as to permit movement of the pulley in the direction of the longitudinal line of the baking chamber, to compensate for elongation of the band as its temperature rises and contraction as its temperature falls. Such movement may be actuated by a weight 29 suspended on two cables 30, each of which passes over a sheave 31 to effect a 90° bend. The weight 29 may be depended in a pit 32, constructed for that purpose, and in an oven 200' long, the weight should be about 6000 pounds for a 32" steel band.

Inasmuch as the product to be heat treated is carried on the upper reach of the band, this is supported, preferably, by rollers 33 preferably spaced about 100" apart.

Each roller 33 is made of a section of seamless tube at least as long as the band 21 is wide. It is fitted at each end with a graphite filled oilless bearing 34 which, after the ends of the tube have been counter-bored, is pressed into the counter-bore from one to two inches. These bearings are mounted on an immovable shaft 35 which, in turn, is attached to appropriate fittings 36 fixed to opposite wall columns. The shaft 35 is disposed at right angles to the central line of flow of the band. The roller 33 is positioned on the shaft by steel shaft collars which extend into the counter-bore and terminate slightly short of the bearing faces, thus providing a slight tolerance to compensate unequal expansion when the roller 33 rises in temperature faster than the protected shaft. Before assembly of the roller on the shaft, a quantity of powdered graphite is placed in the roller to be confined between the two bearings. This will gradually but very slowly find its way through the bearings, thus lubricating the bearings as well as the faces of the shaft collars which in such circumstances function, to a slight degree, as thrust bearings. The extension of the walls of the roller over the inner end of the shaft collars prevents foreign matter reaching surfaces where attrition would be produced.

Band guiding mechanism

When a broad steel band 21 is used as an oven carrier for products which contain water, such, for example as soda crackers, cookies and the like, the maintenance of uniform temperature in the band is dependent upon uniform distribution of the product on its entire surface; and this, in turn is dependent upon correct, continuous functioning of the machine which places the product on the band. In practice, it is a common occurrence for the band to be incompletely loaded. For example, one-half of the band may be loaded and the other half vacant. It is obvious that the unloaded side of the band will rise to a much higher temperature than the other side which is loaded with wet product. The higher temperature side will elongate, causing the band to curve edgewise. This, in turn, will cause the band to wander from the central line of the pulley toward the loaded side, and the loaded side, being shorter, will exert greater pressure on the pulley than the expanded side. It is the purpose of this invention to utilize the unequal pressure exerted upon the pulley, to automatically bring its axis in rotation into perpendicularity with the central line of the band direction. To accomplish this, a pulley 20 is provided, the spokes of which are sufficiently flexible to yield to excess pressure exerted by either side of the band to a degree that, within the range of operation, the axis of rotation will be continuously and automatically adjusted to perpendicularity with the direction of the central line of the traveling band, without movement of the journal bearings. By this principle, uniform pressure of the band against pulley surface, to provide traction for driving, is continuously maintained, while, at the same time, wandering of the band from its central position on the pulley is prevented.

The spokes of the pulleys are preferably laminated in a manner comparable to the construction of laminated leaf springs used in vehicles.

Heat generator

The heat generating unit 38 used preferably in connection with the present invention, is that shown and described in U. S. Patent No. 2,164,954, dated July 4, 1939.

A complete heat generating and regenerating unit of appropriate capacity, as identified in the last above reference, is mounted on a platform 39, appropriately positioned, preferably above the oven, in which case said platform is supported by the outer vertical channels of four or six of the wall columns 40 and appropriately attached thereto.

Heat distributors

A downwardly extending two-way duct 41 is fixed in position to receive the entire discharge of the gas mover 42 of the heating unit 38. Said duct is preferably disposed, at least partially within the adjacent side wall of the heating chamber A, and both branches 43 of the two-way duct 41 are elbowed to approximately 90° to enter the baking chamber through its inner wall.

Beneath the carrying band 21, and with its upper surface as near thereto as the band supports 33 will permit, a combination heat distributor and return duct system is disposed. In the present example, this unit may be approximately 37' 6" long by 32" wide. Its upper members comprise a plurality of longitudinally extending tubes having their upper walls, or faces, in approximately the same horizontal plane. In the present example, eight tubes are used, each having an upper wall 45, or face, and are assembled so as to bring four tubes to the right and four tubes to the left of the vertically extending two-way duct 41. The four tubes to the right and four to the left are united by attachment to a V shaped distribution chamber 46, which, in turn, is in closed communication with the lower branch 43 of the vertical two-way duct 41 in such a manner as to receive gases flowing through said branch. The upper planal walls 45 of each of said tubes 44 are perforated by drill or punch holes 46' distributed uniformly throughout its area. The spacing and the diameter of such holes are inter-related and should be such as to insure that the aggregate area of the perforations in the upper faces of the entire eight tubes will be approximately equivalent to the cross-sectional area of the lower branch 43 of the vertically extending two-way duct. The remaining walls of the tubes, exclusive of the perforated upper wall, should be, at the end where they are attached to the central distribution box, of such cross-sectional dimensions as to enclose, in the aggregate, an area in excess of the lower branch of the vertically extending two-way duct. The side or vertical walls 47 of the tubes 44 are preferably oblique from the vertical plane, to meet the edges of the bottom wall 48 which is less in width than the upper perforated wall 45. The oblique side walls also taper from the distribution chamber in a plane to meet the outer end of the perforated upper wall. The tubes 44 thus described will hereafter be termed the "distribution tubes." They are in all respects similar, except as to their lineal dimensions. Their outer ends terminate in the same plane; their central ends are mitered to correspond with the oblique side of the V shaped distribution chamber 46 to which they are all attached in an approximately air tight manner.

It is the function of the distribution tube assembly to receive gases from the heat generating unit 38 through the lower branch 43 of the two-way duct 41, and inasmuch as the aggregate area of the perforations 46, which comprise the only outlet from said tubes, is of approximately the same area as that of their supply duct, the element of friction through the several thousand perforations will be greater than that encountered in the supply duct, thus providing a resistance against which pressure can be built up in the tubes. Any pressure in the tube will be uniform from end to end. Such pressure will be translated into velocity at every point of outflow, thereby creating jets 49 emitting through each perforation at uniform velocity. Such velocity is uniform at all jets because it is actuated by the same degree of pressure through orifices of similar area.

The heat content of gas resides entirely in the constituent atoms and molecules of such gases. These are separated by space in which nothing resides. No heat, therefore, is contained in the vacant space between the atoms and molecules. At any given temperature each atom or molecule of a given substance contains a definite quantity of heat. When the atoms and molecules contact with an object of lower temperature, they equalize their temperature with such object by giving to it a portion of their contained heat. The quantity of heat transferred from gases to another object then depends upon causing the greatest number of the constituent heat laden atoms and molecules to contact against it. It follows that the quota of heat transferred from gases to another object is directly proportional to the percentage of atomic and molecular contect of the gases upon the object to be heated. Such atomic and molecular contact is greatly accelerated by fabricating the gaseous heat vehicle into relatively minute jets or streams and positively directing these to impact of the greatest possible percentage of the constituent atoms and molecules against the object.

There is a definite best temperature at which to heat treat any food product. By the present method of atomic and molecular impact, the quantity of heat transferred to such product can be greatly accelerated at any given temperature.

By the method of heat transfer described, heat can be infused into the steel band 21 of the present example more rapidly than it is transferred from the band to the product distributed upon it, thereby maintaining the band at the definite best temperature for the heat treatment of the product, and supplying an abundant quantity of heat without increase of intensity, or temperature. It is an object of this invention to provide a method whereby an over-abundant supply of heat quantum can be maintained at any desired temperature. A top heat distributor unit C, in all respects similar to the bottom heat distributor unit D above described, is disposed at an appropriate position above the band 21 and in direct relation to the bottom distributor D, to deliver heat laden jets 49 downwardly upon the product or upon a metallic ceiling disposed between said upper distributor and the product, the upper branch 43 of the vertically extending two-way supply duct 41, and its return outlet port 50 in communication with the upper branch of the upwardly extending two-way return duct 51.

A closely fitted, upwardly extending blade damper 52 is mounted on a shaft 53 which extends horizontally through the line of junction of the two branches of the supply duct 41. The shaft is rotatably movable, and means is provided externally of the duct for locking the shaft, and its damper, in many fixed positions. The function of the damper 52 is to pro-rate the heat vehicle between the lower and upper branches 43 of the supply duct 41. Its range of movement should be preferably such as to enable the operator to divert the entire heat vehicle to the bottom branch or to the top branch of the duct or to divide the heat vehicle between the two branches on any ratio desired.

Dampers 54 are also provided for reducing the quantity of heat vehicle entering the four outside tubes 44.

*Return system*

When the streams or jets of heated gases have impacted the band 21, thereby giving a portion of their heat content to the band, their temperature is lowered but they still contain a valuable quantity of heat.

There is a crevice 55 extending longitudinally between each two tubes 44. Each such crevice is the full length of the tubes, minus short spaces which are blanked by spacing members 56. These crevices 55 extend downwardly or upwardly between the tubes, and communicate with a duct 57, or flow-way. The duct 57 is formed by vertical side walls extending from the plane of the perforated plates 45 downwardly an appropriate distance and attached in an air tight manner to a horizontal wall to form a chamber beneath or above the distributor tubes of cross sectional dimensions which enclose an area equivalent to at least one-half of the area of the inflow port of the gas mover 42. An opening 58 is formed in the side of said duct 57, approximately opposite to the two-way delivery duct 41. The area of this opening is at least equivalent to the area of the inflow port of the gas mover. The two-way return duct 51 is substantially similar to the two-way supply duct 21 above described, and is disposed in position to permit its lower branch 50 to be connected to said opening in the return duct, in an air tight manner. The upper end of the two-way return duct 51 is connected in an air tight manner in communication with the outer cylinder wall of the heating unit 38. When the gas mover 42 of the heating unit 38 is in operation, it produces rarefaction, or negative pressure, throughout the entire return system as described, thereby causing the spent gases in the baking chamber to flow through the crevices 55 between the tubes 44 and the crevices at the sides of the outer tubes into the chamber 57 beneath or above the distributor tubes 46, thence through the lower branch 50 of the two-way return duct 51 to the regenerating heater. This combination of distribution and return system is correlated in a manner to provide return flow-ways in such proximity to all heat supply jets that dilution of said jets, by mixing with spent gases is to a very high degree prevented.

The side walls and the bottom wall of the distributor tubes form the upper wall of the return flow-way, and as a result, heat exchange would occur between the low temperature gases in the return system and the high temperature gases in the distributor tubes unless some provision were made to prevent such heat exchange. Accordingly, an insulatory housing, comprising vertical side walls 59 and horizontal bottom wall 60, all spaced from the walls of the distribution tubes, is attached to each distribution tube throughout its length. The area enclosed between the walls of the distribution tube and the walls of the insulatory housing may be filled with material 61 thermally non-conductive. If, however, such space is left empty, containing only "dead air," it will still comprise a highly effective resistance against heat exchange occurring between the gaseous heat vehicle flowing in the distribution tubes and the lower temperature, or spent, gases flowing in the return system.

Fuel oil leveling device

The means for controlling supply of fuel to the combustion zone and response to a demand for a change of temperature in a baking chamber is illustratively exemplified in Figures 1 and 9 and consists of the following novel combination of elements arranged on the outside of the oven adjacent each heat generating unit 38.

Two upright pieces 62 and 63 of standard 2 inch pipe are united by means of a T-fitting 64. The upper end of the lower piece of pipe 63 is reduced by a bronze bushing 65 having an inside diameter of $1^{17}/_{32}$ inch. A piece of light 1½ inch diameter brass tube 66 is concentrically arranged within the pipe 63 and is of sufficient length to extend below the bushing 65 and above the level of an atomizing nozzle 67 under all conditions of surface-pass through said bushing. The upper pipe 62 is loosely closed at its top by a cap or other appropriate fitting 68 having an opening 69 at its upper end. A ⅜ inch rod 70 passes through the opening 68 in said cap and is fixed at its lower end to the upper end of said brass tube 66. The brass tube and rod assembly are slidably disposed relative to the pipe assembly 62—63 in a manner which allows the rod to be actuated by gravity. An arm 71 is attached to the pipe 62 by being clamped thereto near its upper end. At the outer end of said arm an upwardly extending post 72 is fixed, the upper end of which pivotally supports one end of a movable lever 73. Intermediately of the post and the pipe and on the arm a pressure operated bellows 74 is located, the bellows used being preferably of the known "Sylphon" type which is covered by a protective housing 75 having a guiding tube 76 fitted concentrically in its top. A rod 77 is slidably fitted in the tube with its lower end resting on the head of the bellows and engages the said lever 73 by means of a slidable connection 78. The other end of the lever 73 is pivotally connected to said rod 70 in such manner that upward or downward movement of the lever will respectively elevate and lower the tube 66.

Openings 79 are provided in the wall of the brass tube 66 at an elevation below the level of the burner nozzle 67 when the tube is in its maximum elevated position. A pump 80 for delivering fuel oil from a source of supply is connected to a pipe 81 which is connected to one of the lateral openings of said T-fitting 64. The opposite lateral opening of said T is connected to a pipe 82 which connects with the fuel atomizing nozzle 67.

As the pump is operated fuel oil will flow into the T-filling 64 and fill the annular space above the latter between the pipe 62 and the brass tube 66 until its level reaches the openings 79 in the tube. The oil then flows through said openings and downwardly through the brass tube 66 and pipe 63 to a return pipe connection 83 to the source of fuel supply from which it was drawn by the pump. In this manner a continuous head of fuel oil in excess of that required by the operation is maintained. The fuel oil in the lateral branch 82 which supplies the atomizer 67 will stand at the same level as in the annular space in the pipe 62. Thus, by elevating or lowering the slidable tube 66, the oil level supply to the atomizer is respectively elevated and lowered. The atomizer nozzle 67 is operated by a supply of steam or compressed air maintained at constant pressure, and delivered to the nozzle through a tube 84. Under constant conditions of aspiration the fuel supply delivered by the nozzle will vary in direct proportion to the distance through which the liquid is raised by the aspirating influence.

The said Sylphon bellows 75 mounted on the carrying arm 71 is gasketed in a pressure tight manner except for a bleed opening 85 in its base. The pressure tight tube 84 communicates between the interior of the bellows and the supply of steam or compressed air which comprises the atomizing agent for the fuel. An electrically operated valve 86 normally closed is placed in said latter tube. An electric switch normally closed is operative by a heat sensitive instrument 87 which is located in the baking chamber A of the oven, and is connected through an electric circuit 88 to said electrically operated valve 86. When temperature in the baking chamber rises above that desired the electric switch is opened by the heat sensitive instrument 87 to open said electric circuit 88, and close said electrically operated valve 86, thereby allowing pressure to be exhausted from the interior of the bellows 74 through said bleed opening 85. The lever arm 73 is provided with a weight 89 sufficient to cause the tube 66 to descend as pressure is exhausted from the bellows 74, thus lowering the level of the liquid fuel in the supply pipe 62 to the atomizer with subsequent diminishing of fuel feed to the zone of combustion.

Having now described the present invention and the manner in which the same operates, what I claim and desire to secure by Letters Patent is:

1. In an oven of the type herein described the combination of a planal carrier for product to be heat treated during its transit through the oven, a plurality of conduits disposed in parallel series and extending longitudinally of the oven, each conduit having one of its sides distributively perforated the perforated sides of all conduits being disposed in a common plane in comparative proximity to and parallel with said planal carrier to effect impingement of jets of heated gas issuing from said perforations toward said carrier or the product carried thereupon, and means for withdrawing spent gases through passage ways located between said conduits.

2. In an oven of the type herein described the combination of a planal carrier for product to be heat treated during its transit through the oven a plurality of conduits disposed in parallel series and extending longitudinally of the oven, each conduit having one of its sides distributively perforated, the perforated sides of all conduits being disposed in a common plane parallel to the said planal carrier and in such proximity thereto as to cause impingement of jets of heated gas, issuing from said perforations, against said carrier or product carried thereupon, means for withdrawing spent gases through crevices between said conduits, means for reheating said withdrawn gases, and means for reimpelling said reheated gases through said perforations.

3. A bake oven, comprising in combination a continuous traveling carrier for the articles to be baked, a plurality of ducts spaced from each other and from opposite faces of the carrier, the sides of said ducts directed towards the faces of the carrier being perforated, said perforated sides being located in common planes respectively above and below said carrier, and a heat generating and recirculating system supplying heated gases under pressure to said ducts to force said gases through said perforations to form jets directed against both faces of the carrier and the articles, and causing said gases to return to said circuit through the spaces between said ducts said spaces being so disposed as to cause said returning gases to flow transversely through the respective planes in which said perforated sides are located.

THOMAS J. STEPHENS.